United States Patent
Bosschaert et al.

(10) Patent No.: US 7,665,087 B1
(45) Date of Patent: Feb. 16, 2010

(54) MEMORY EFFICIENT CLASSLOADING TO REDUCE THE NUMBER OF CLASS COPIES

(75) Inventors: Allaert J. D. Bosschaert, Wijster (NL); Philip J. Murphy, Dublin (IE); David J. Hayes, Dublin (IE); Sean P. Baker, Co. Wicklow (IE)

(73) Assignee: Iona Technologies Limited (BM)

( * ) Notice: Subject to any disclaimer, the term of this patent is extended or adjusted under 35 U.S.C. 154(b) by 648 days.

(21) Appl. No.: 10/319,875

(22) Filed: Dec. 13, 2002

Related U.S. Application Data

(60) Provisional application No. 60/341,089, filed on Dec. 13, 2001.

(51) Int. Cl.
  *G06F 9/455* (2006.01)
  *G06F 9/46* (2006.01)
  *G06F 9/44* (2006.01)

(52) U.S. Cl. .............................. 718/1; 718/104; 717/166

(58) Field of Classification Search .................... 718/1, 718/104; 717/166; 709/223
See application file for complete search history.

(56) References Cited

U.S. PATENT DOCUMENTS

| | | | |
|---|---|---|---|
| 6,339,841 B1 * | 1/2002 | Merrick et al. .............. | 717/166 |
| 6,385,722 B1 * | 5/2002 | Connelly et al. ............... | 713/2 |
| 6,490,255 B1 * | 12/2002 | Kiriha et al. ................. | 370/254 |
| 6,738,977 B1 * | 5/2004 | Berry et al. .................. | 719/332 |
| 6,874,020 B1 * | 3/2005 | Da Palma et al. ........... | 709/223 |
| 6,915,511 B2 * | 7/2005 | Susarla et al. ............... | 717/166 |
| 6,971,097 B1 * | 11/2005 | Wallman .................... | 718/101 |

* cited by examiner

*Primary Examiner*—Meng-Ai An
*Assistant Examiner*—Camquy Truong
(74) *Attorney, Agent, or Firm*—IP Authority, LLC; Ramraj Soundararajan

(57) ABSTRACT

A system and method are disclosed for decreasing the number of duplicate library copies loaded into memory without endangering the security of applications in a runtime environment. In a preferred embodiment, applications in the runtime environment may be provided with a delegation classloader that identifies any libraries referenced by the delegation classloader's respective application. The delegation classloaders then delegate the task of providing the referenced libraries to a distinct software component. In a preferred embodiment, the distinct software component may be another delegation classloader or other loader adapted to look at a single library or a small set of libraries. These "atomic" classloaders can be freely shared by multiple applications since they do not expose any application's internals. Each atomic classloader preferably loads one copy of its associated library or libraries into memory. This single instance of shared library code is made available to multiple applications without requiring explicit cooperation between applications or endangering their security.

6 Claims, 8 Drawing Sheets

MEMORY EFFICIENT CLASSLOADING TO REDUCE THE NUMBER OF CLASS COPIES

CROSS-REFERENCE TO RELATED APPLICATIONS

This application claims priority from U.S. provisional patent application No. 60/341,089, filed Dec. 13, 2001, which is hereby incorporated by reference in its entirety for each of its teachings and embodiments.

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

FIELD OF THE INVENTION

This invention relates to the field of computer programming.

BACKGROUND OF THE INVENTION

Object-oriented programs, such as those written in Java, often incorporate classes or other resources that reside in existing libraries. The Java environment provides a means for loading such libraries on demand at runtime.

Runtime loading of library code in Java is achieved using software objects known as "classloaders." Classloaders are adapted to obtain referenced library code, organize the code into classes (if necessary), and make the code available to software that references the library.

When library code is needed multiple times by a Java program, its classloader loads the library only once and caches it for future requests. A single Java runtime environment, however, often runs multiple applications at the same time, each of which is typically provided with its own classloader. Moreover, larger applications may instantiate multiple classloaders for different program components. When two applications or components require the same library code, their classloaders each load a copy of it into memory. This duplication requires additional memory and may significantly affect system performance.

A typical prior art scenario illustrating this problem is depicted in FIG. 1. Shown in FIG. 1 is a Java runtime environment 100 that contains an application server 102 built on top of an object request broker (ORB) 104. Several applications 106 are deployed in application server 102. One or more of applications 106, such as application 106c in the particular example of FIG. 1, may also be containers for other applications 108. Also shown in FIG. 1 is a security provider 110 running in the same Java runtime environment 100, and built on top of an encryption engine 112.

As is further shown in FIG. 1, each application 102-112 in environment 100 is provided with its own classloader 114 adapted to serve resources required by its respective application. Moreover, in the exemplary scenario of FIG. 1, each application 102-112 references the same XML parser library, xml.parser.jar. Consequently, at run time, multiple copies of this XML parser library are loaded into memory, one by each classloader 114. As noted, this duplication consumes memory and negatively affects performance.

One possible approach for solving this problem might be to provide a single classloader for two or more applications. The shared classloader could examine the source code of both applications and identify all libraries referenced by both. It could then load a single copy of such common libraries for use by both applications.

This approach, however, suffers from several drawbacks. First, if the first and second applications require different versions of the same library, the classloader may load a version of the library not compatible with one of the applications.

Second, sharing a classloader in this way permits each application to load all classes and resources of the other application. Consequently, if one of the applications is malicious, it may harm the second application by, for example, creating instances, making invocations, or examining data of the second application.

SUMMARY OF THE INVENTION

A system and method are disclosed for decreasing the number of duplicate library copies loaded into memory without endangering the security of applications in a runtime environment. In a preferred embodiment, one or more applications in the runtime environment are provided with a delegation classloader that identifies any libraries referenced by its respective application. The delegation classloaders then delegate the task of providing the referenced libraries to a distinct software component.

In a preferred embodiment, the distinct software component is another delegation classloader or other loader adapted to look at a single library or a small set of libraries. These "atomic" classloaders can be freely shared by multiple applications since they do not expose any application's internals. Moreover, where two applications use different versions of the same library, the system treats them as different libraries and provides a separate classloader for each version.

Each atomic classloader preferably loads one copy of its associated library or libraries into memory. This single instance of shared library code is made available to multiple applications without requiring explicit cooperation between applications or endangering their security.

DESCRIPTION OF THE PREFERRED EMBODIMENTS

Figure 2:
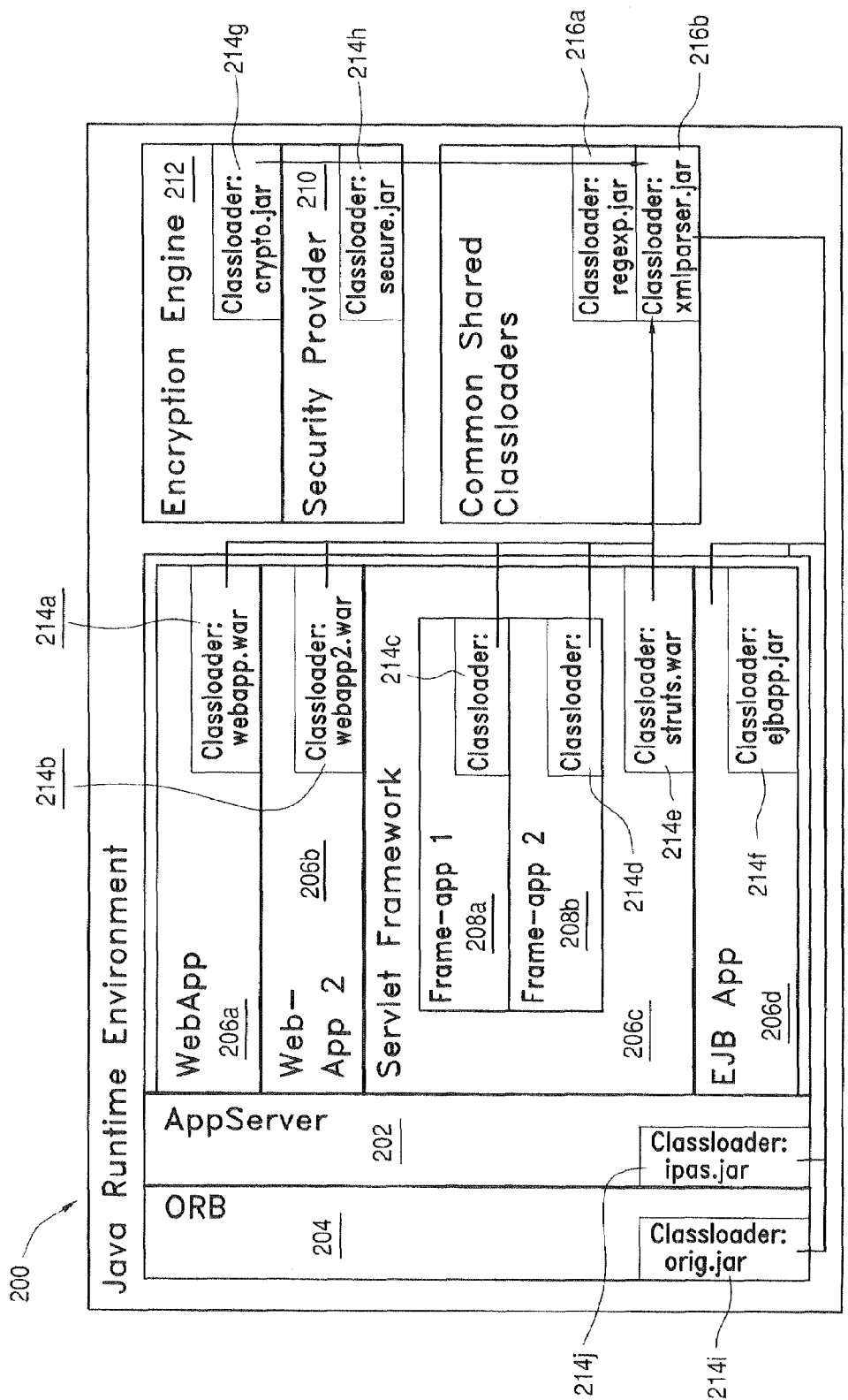
FIG. 2 illustrates a preferred embodiment of the present system and method.

One preferred embodiment of the present invention is described in connection with an exemplary Java runtime environment such as the environment shown in FIG. 2. As shown in FIG. 2, a Java runtime environment 200 preferably contains an application server 202 built on top of an object request broker (ORB) 204. Several applications 206 are deployed in application server 202. One or more of applications 206, such as application 206c in the particular example of FIG. 2, may also be containers for other applications 208. Also shown in FIG. 2 is a security provider 210 running in Java runtime environment 200, and built on top of an encryption engine 212.

Figure 1:
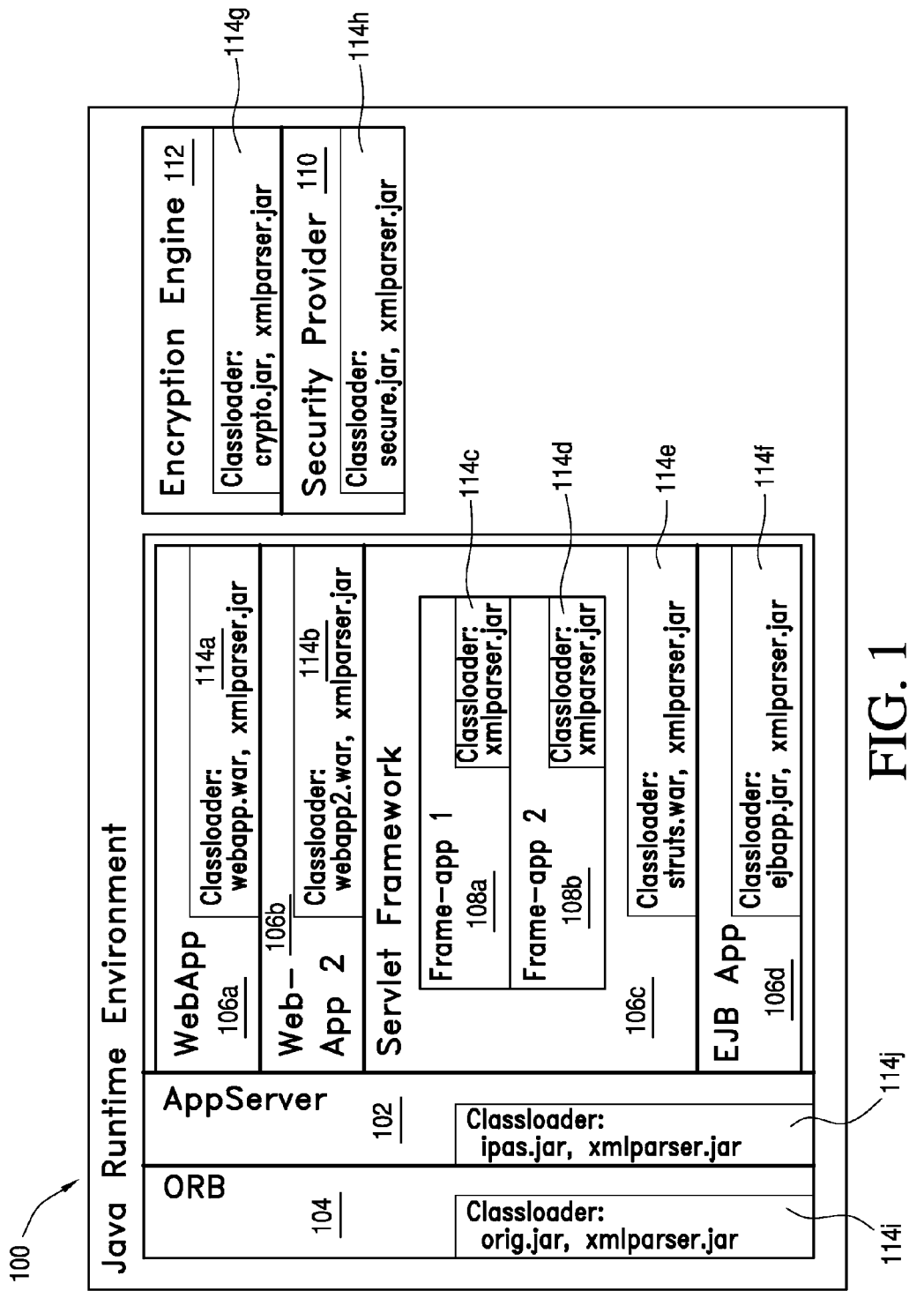
FIG. 1 illustrates a runtime environment using prior art classloaders.

Each application 202-212 is preferably provided with a classloader 214. In a preferred embodiment, classloaders 214 are of a construction that differs from the construction of prior art classloaders, such as classloaders 114 in FIG. 1. More specifically, classloaders 214 preferably belong to a novel class of classloaders referred to herein as delegation classloaders.

As described in more detail below, a delegation classloader is adapted to identify libraries referenced in a piece of code and delegate the task of loading those libraries to a second object. The second object may be a delegation classloader or other loader, as described below. Illustratively, as shown in FIG. 2, each classloader 214 is adapted to delegate the task of loading xmlparser.jar to a single shared classloader 216. As a result, only one copy of xmlparser.jar is loaded, thus saving memory.

In a preferred embodiment, each shared classloader 216 is preferably an "atomic" classloader, i.e., adapted to look at one library or a small set of libraries (e.g., one library and all libraries that it references). This makes it possible to reuse shared classloaders 216 since they provide only a relatively small set of resources and therefore do not expose application-specific resources to other applications.

Figure 3:
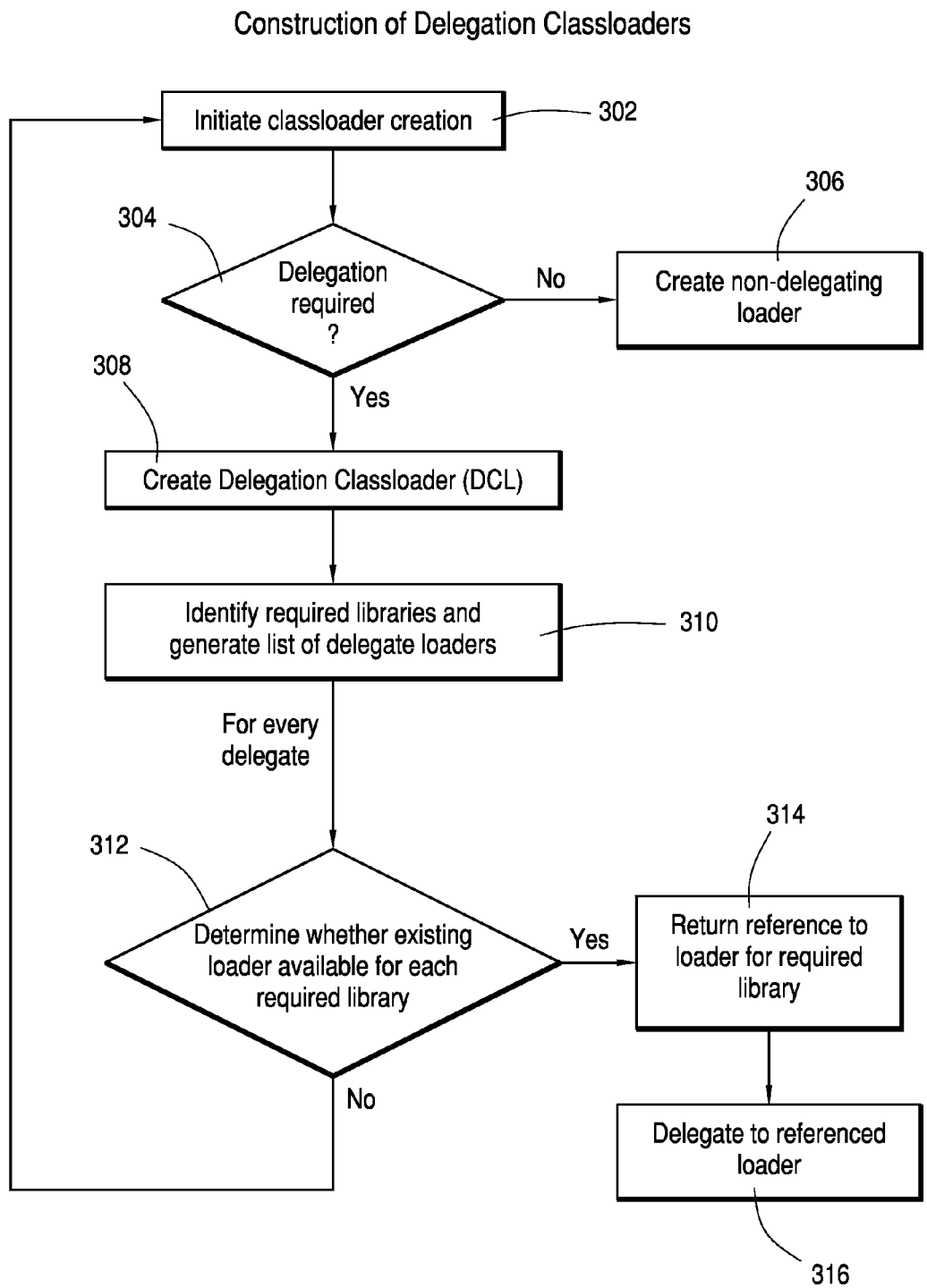
FIG. 3 illustrates a preferred embodiment of the construction of a delegation classloader in the present system and method.

FIG. 3 illustrates a preferred embodiment for the construction of a delegation classloader. To facilitate understanding of the preferred embodiments, aspects of FIG. 3 are described in connection with the specific scenario of FIG. 2. It should be recognized, however, that the delegation classloaders and other objects described below are capable of application in a wide variety of runtime environments.

Turning to FIG. 3, at 302, classloader creation is initiated. At 304, The application or other resource to be loaded is examined to determine whether or not it includes references to one or more libraries. If the application or other resource has no library dependencies, a delegation classloader is not required and a non-delegating loader is created to load the application or other resource (step 306). Otherwise, at 308, a delegation classloader 300 is created.

At 310, delegation classloader 300 identifies each library referenced by the application or other resource and adds the referenced libraries to a list. For example, in the illustrative scenario of FIG. 2, classloader 214a examines WebApp 206a, determines that it includes a reference to xmlparser.jar, and adds xmlparser.jar to its list.

Delegation classloader 300 is preferably adapted to distinguish between resources that it will load itself and other resources with respect to which it will delegate that task. For example, a delegation classloader tasked with loading an application may itself load the application but delegate the task of loading any libraries referenced by the application. Alternatively, the programmer may specify the resources to be loaded directly by the delegation classloader and the resources for which the delegation classloader should delegate loading to another loader. In the illustrative scenario of FIG. 2, classloader 214a preferably itself loads webapp.war. By contrast, with respect to libraries referenced by WebApp 206a (e.g., xmlparser.jar), classloader 214a preferably delegates the task of loading such libraries to another delegation classloader, as described below.

Figure 4:
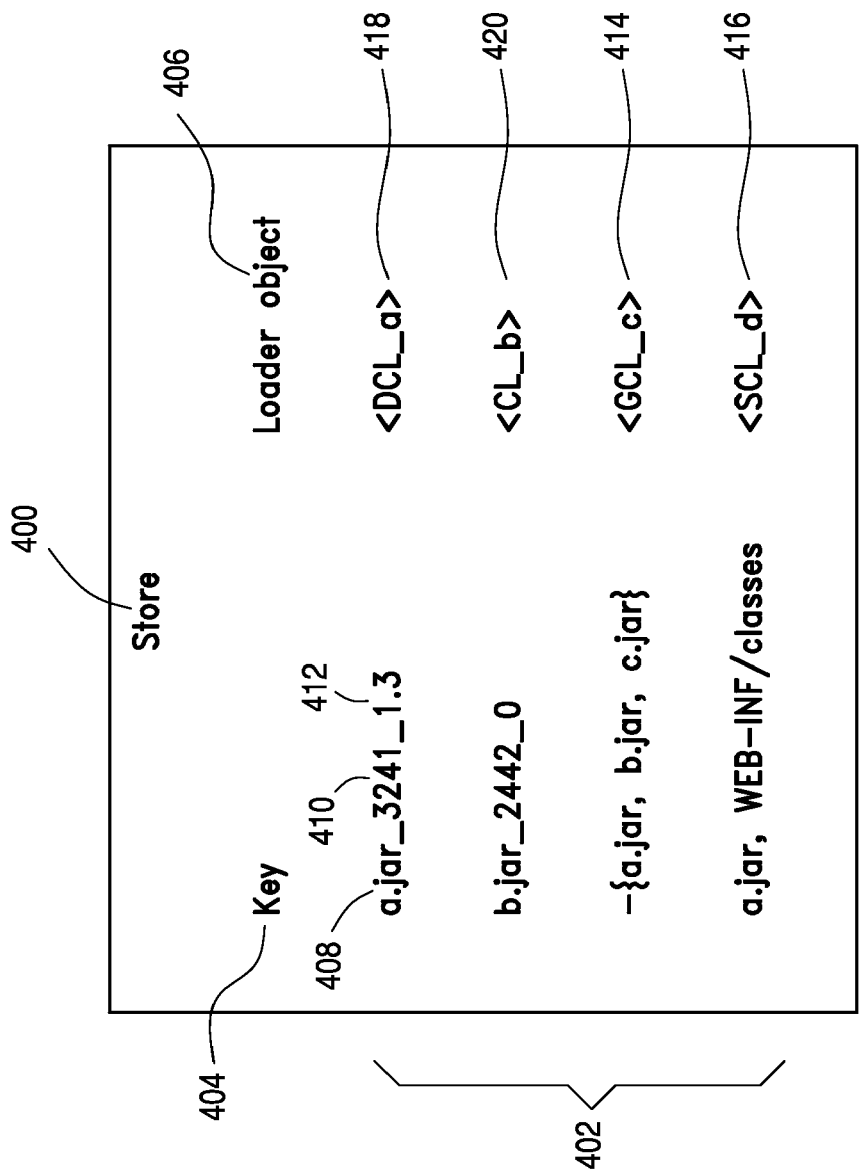
FIG. 4 illustrates a preferred embodiment for implementing a store in the present system and method.

At 312, the delegation classloader determines whether an existing loader is available to load each library in the list. In a preferred embodiment, this determination is made by consulting a store of existing loaders. One preferred embodiment for implementing such a store is shown in FIG. 4, described below. More generally, the determination may be made by communicating directly or indirectly (e.g., via an intermediary adapted to facilitate or broker the communication) with other loaders to determine whether a loader for the library is available.

As shown in FIG. 4, a store 400 preferably comprises a number of entries 402. Each entry preferably comprises a key 404 that uniquely identifies a library and a reference 406 to a loader for the library. In a preferred embodiment, the key may include a plurality of elements including a name 408, a size 410, and a version number 412.

In an alternative preferred embodiment, the delegation classloader may directly determine whether or not an instance of each library in the list (or any required resource generally) is available in memory. In a preferred embodiment, this determination may be made by consulting a store that includes available libraries (and resources) or references to such libraries (and resources). More generally, the determination may be made by communicating directly or indirectly with other loaders or system entities to locate and use an available instance of a required library (or resource) in memory.

Returning to FIG. 3, at 314, for each library in the list with an existing loader, a reference to the loader for the resource is returned. As shown in FIG. 4, in some cases the existing loader may be another delegation classloader (e.g., entry 418). In other cases, the existing loader may be some other kind of loader (e.g., entry 420). At 316, delegation classloader 300 delegates the task of loading the library to the existing loader for the resource. For example, in the illustrative scenario of FIG. 2, if a loader for xmlparser.jar had previously been created, classloader 214a would find a reference to this loader in store 400 and delegate the task of loading xmlparser.jar to it.

By contrast, for each resource in the list without an existing delegation classloader, delegation classloader 300 returns to step 302 to initiate creation of an appropriate classloader to load the library. For example, in the illustrative scenario of FIG. 2, if no loader for xmlparser.jar had previously been created, delegation classloader 214a creates one and delegates to it the task of loading xmlparser.jar.

To maximize efficient sharing of libraries, the classloaders created in this step preferably load only a single library. In some preferred embodiments, however, the system may be configured to allocate loading of some set of libraries to a single classloader. This may be advantageous where, for example, one library includes references to several others or where some small set of libraries are otherwise related.

In a preferred embodiment, the present system and method may comprise a number of different delegation classloaders each adapted to load a different library format. Each library preferably comprises a collection of resources which may, for example, comprise one or more classes, Web pages, or other resources that may be served by a classloader. Suitable delegation classloaders may be provided for Java archives, Web archives, or any other desired format. Delegation classloader 300 preferably identifies the format of the required library and creates a suitable delegation classloader (or other loader) for loading that format.

A reference to the new delegation classloader for the referenced resource is preferably added to store 400 (in embodiments that comprise such a store). Consequently, the next time a delegation classloader consults the store, the reference will be found, thus avoiding the need to load a second copy of the library.

As demonstrated by FIG. 3, in a preferred embodiment, the delegation classloader model of the present system and method is recursive. Thus, for example, a delegation classloader created to provide a particular library may itself examine the library for any dependencies and identify or create any necessary delegation classloaders or other loaders for libraries referenced by the library that it looks at.

In some cases, two or more libraries required by a program may include circular references to each other. In such cases, the recursive nature of the model shown in FIG. 3 may lead to an infinite loop in which, for example, each library's delegation classloader repeatedly delegates to the other. A preferred embodiment for handling such circular references is described in connection with FIG. 5.

Figure 5:
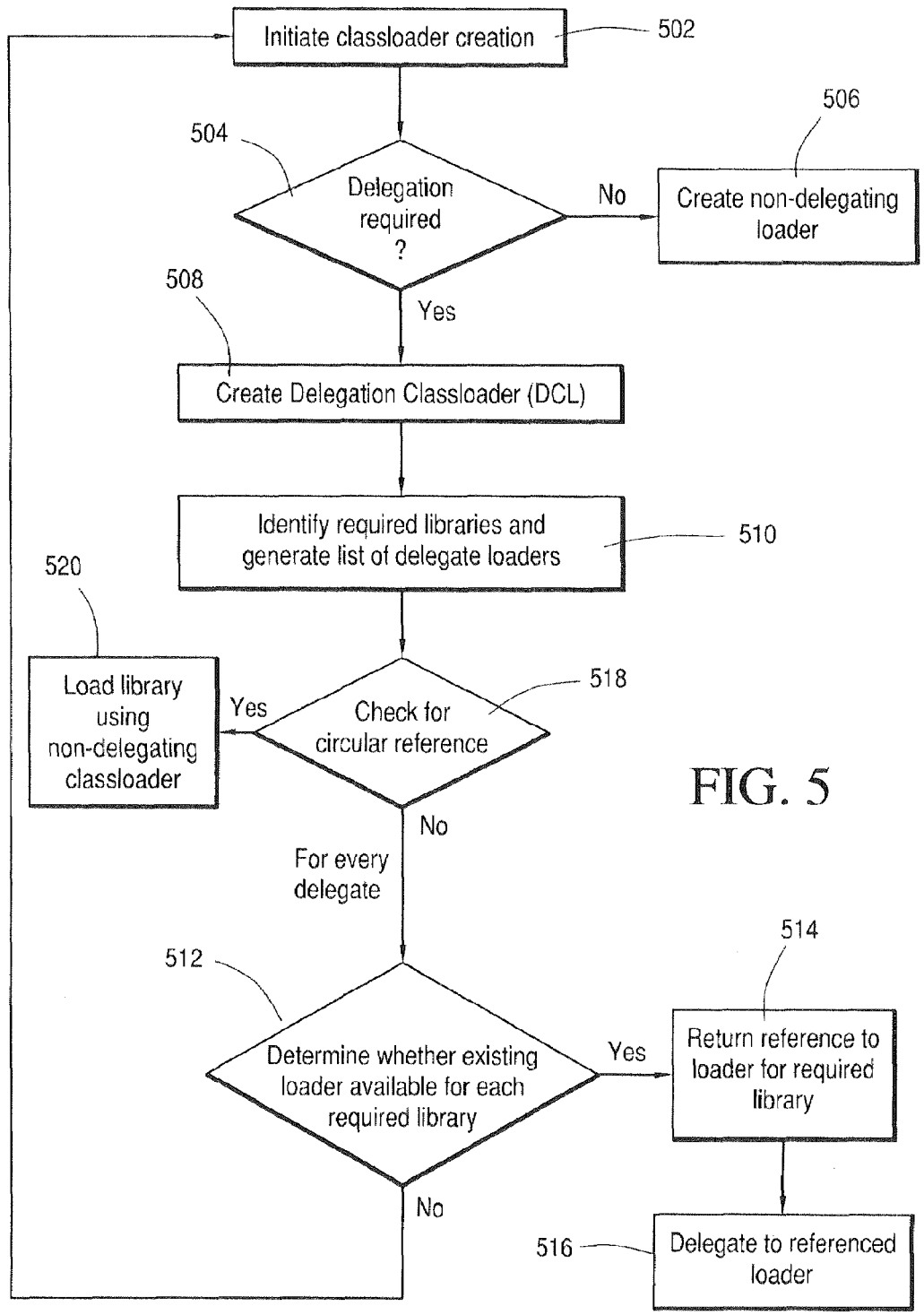
FIG. 5 illustrates a preferred embodiment of the construction of a delegation classloader in the present system and method.

Shown in FIG. 5 is an additional step 518 in which the delegation classloader checks for circular references. If a circular reference is identified, the resource is preferably loaded using a non-delegating classloader (step 520). In other respects, the steps shown in FIG. 5 are the same as in FIG. 3.

As noted above, delegation classloaders are preferably provided for any required library formats. In one preferred implementation of the present system and method which simplifies classloader construction, format-specific aspects of the classloader function are allocated to an abstraction layer that comprises objects referred to herein as bytes providers. The resulting simplified delegation classloaders are referred to herein as bytes provider delegation classloaders or BP delegation classloaders.

Figure 6:
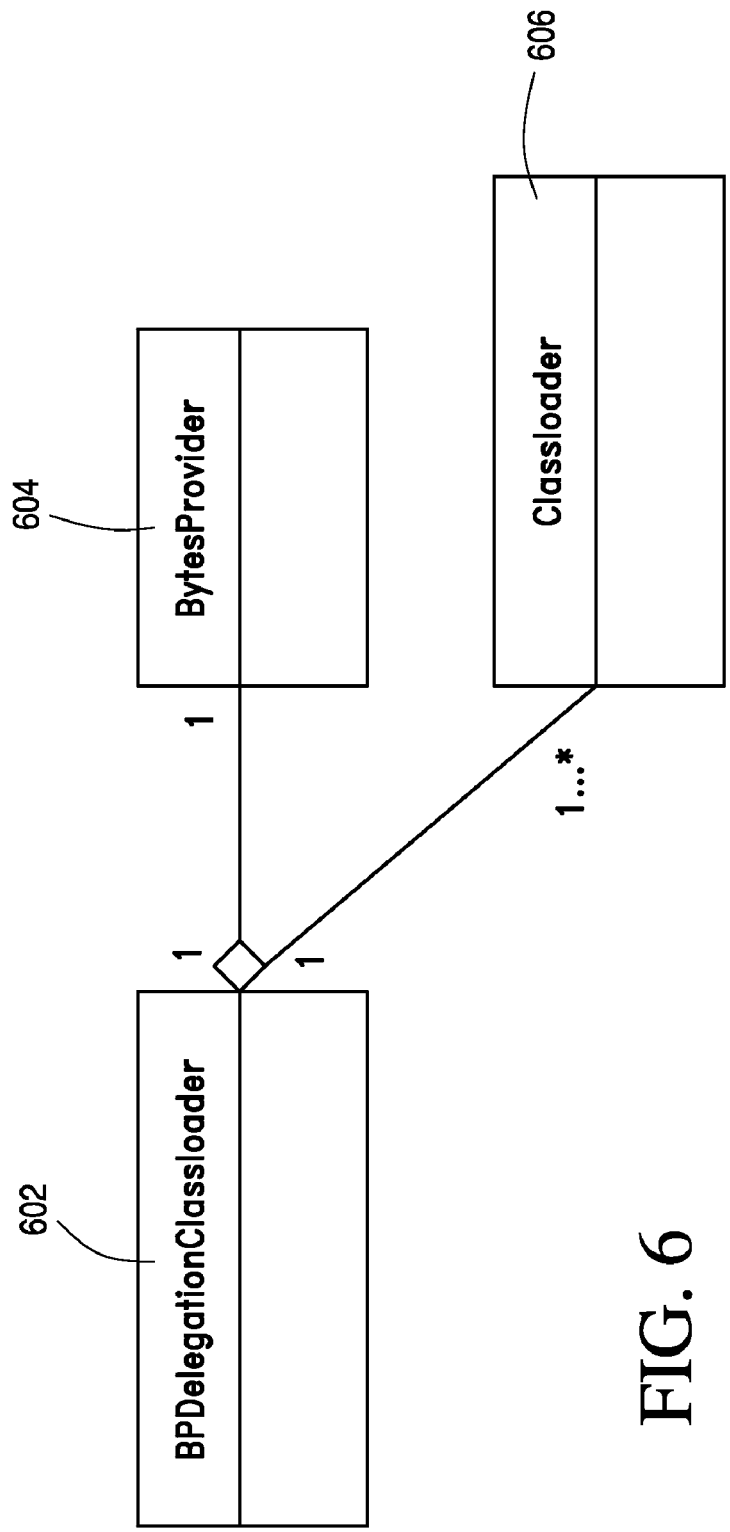
FIG. 6 illustrates a preferred embodiment of the relationship between a bytes provider delegation classloader and a bytes provider in the present system and method.

FIG. 6 illustrates the relationship between bytes providers and BP delegation classloaders in one preferred embodiment. As shown in FIG. 6, a BP delegation classloader 602 preferably creates an appropriate bytes provider 604 adapted to read specified resources and provide them to BP delegation classloader 602.

As above, BP delegation classloader 602 preferably delegates the task of loading libraries referenced in the application or other resource for which it is directly responsible to a distinct software object, such as another BP delegation classloader 606. In a preferred embodiment, each BP delegation classloader 606 is an atomic classloader responsible for a single library or small set of libraries. Each BP delegation classloader 606 is also preferably paired with an associated bytes provider adapted to look at the library or small set of libraries and provide bytes from the library or libraries to BP delegation classloader 606.

Figure 7:
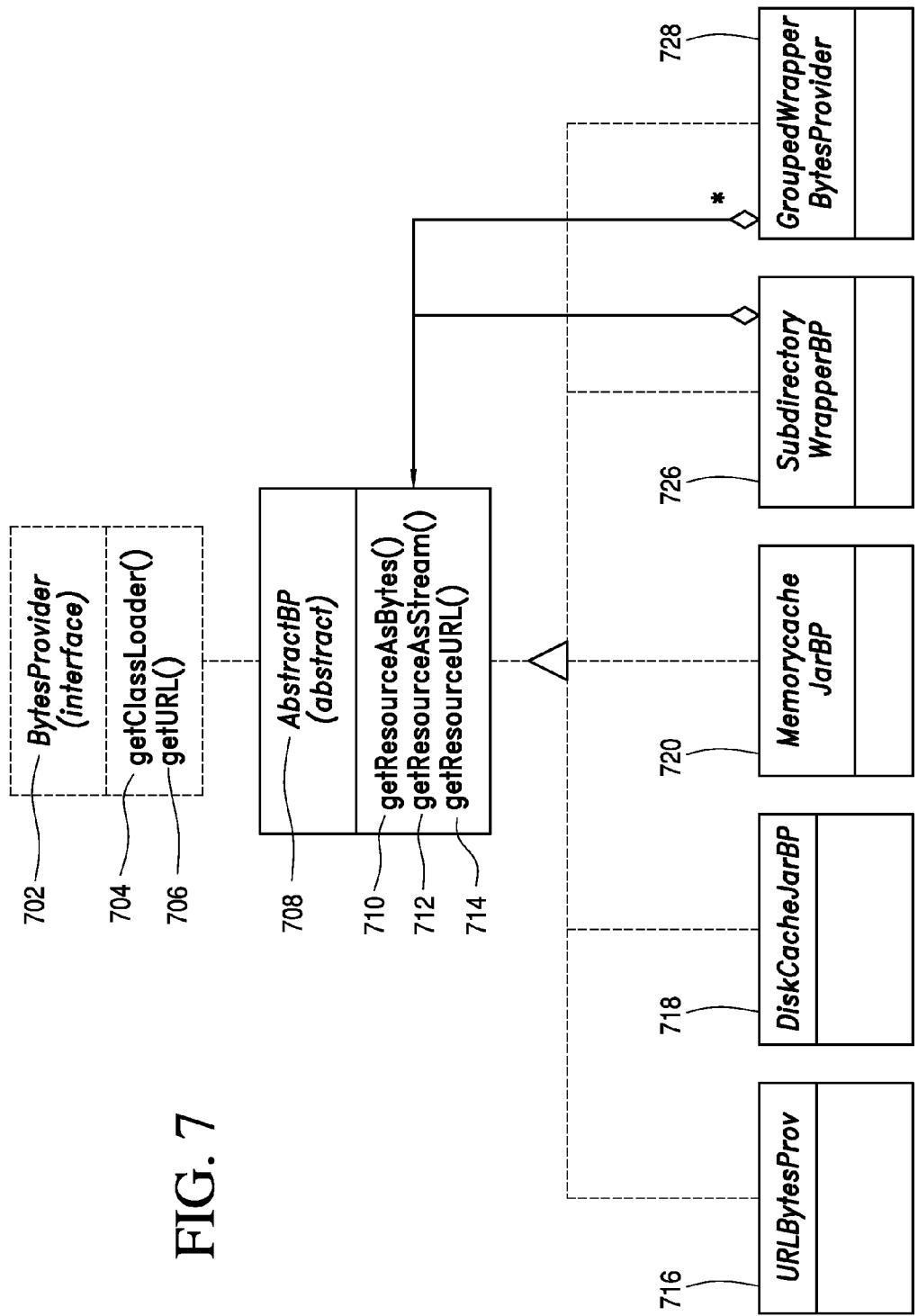
FIG. 7 illustrates a preferred embodiment of a bytes provider hierarchy.

A preferred embodiment of a bytes provider hierarchy is shown in FIG. 7. As shown in FIG. 7, a hierarchy 700 preferably comprises a bytes provider interface 702 which defines methods for obtaining certain information from a bytes provider. Interface 702 preferably defines a getClassLoader method 704 that returns the bytes provider's associated BP delegation classloader and a getURL method 706 that returns the URL the bytes provider looks at.

Hierarchy 700 further preferably comprises an abstract bytes provider 708 which extends interface 702. Abstract bytes provider 708 preferably defines a plurality of methods for reading data out of a bytes provider. In a preferred embodiment, these include a getResourceAsBytes method 710, a getResourceAsStream method 712, and a getResourceURL method 714.

Hierarchy 700 further preferably comprises a plurality of specific bytes providers 716-720. These include a URLBytesProvider 716 that looks at a URL, a DiskCacheJarBytesProvider 718, and a MemoryCacheJarBytesProvider 720. Bytes providers 718 and 720 preferably look at JAR files, and are adapted to cache a JAR by loading it into memory or expanding it on disk, respectively. In a preferred embodiment, the decision whether to cache a JAR in memory or on disk is preferably based on an evaluation of the cache watermark settings and available memory.

In a preferred embodiment, additional bytes providers suitable for reading any desired format may be provided. These may be necessary, for example, in cases where a loading mechanism is required that is not provided by any of the bytes providers shown in FIG. 7, such as loading out of an EAR-SCO directory structure.

Also shown in FIG. 7 are two types of wrapper bytes providers including a SubdirectoryWrapperBytesProvider 726 and a GroupedWrapperBytesProvider 728. SubdirectoryWrapperBytesProvider 726 preferably provides a wrapper around two or more bytes providers in a single directory, for example, one bytes provider that looks at a directory's root and a second one that looks at a subdirectory. The SubdirectoryWrapperBytesProvider 726 may thus be used to provide a single interface to all (or some subset of) libraries in a directory.

GroupedWrapperBytesProvider 728 is preferably adapted to wrap around an arbitrary set of bytes providers and provide a single interface to all libraries looked at by those bytes providers. This may be useful, for example, if the bytes providers serve as one logical unit or they are associated with a single classloader. In addition, by creating a GroupedWrapperBytesProvider 728 around all bytes providers, it is possible to effectively disable delegation classloading and provide a single interface for loading any library.

In operation, when a BP delegation classloader wishes to delegate the task of loading a resource to another classloader, it determines whether a bytes provider or other loader for the resource exists. As above, this step may be achieved by consulting a store or by alternative means.

If an existing bytes provider for the resource is found, the calling BP delegation classloader invokes the bytes provider's getClassLoader method to obtain the bytes provider's BP delegation classloader. It then delegates the task of providing the resource to the BP delegation classloader. Alternatively, if another loader for the resource is found, the BP delegation classloader delegates the task of loading the resource to the loader.

Figure 8:
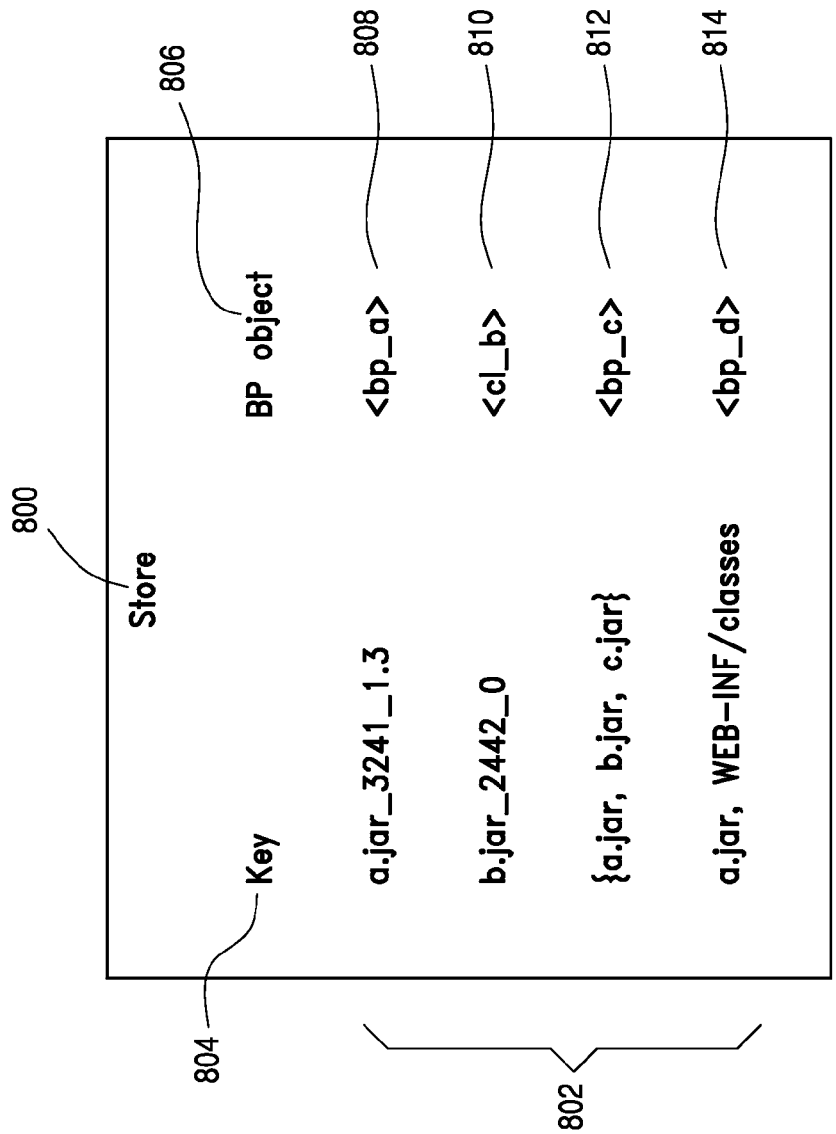
FIG. 8 illustrates a preferred embodiment for implementing a store in the present system and method.

One preferred embodiment for a store 800 is shown in FIG. 8. As shown in FIG. 8, store 800 preferably comprises a plurality of entries 802. Each entry preferably comprises a key 804 and a reference 806 to a bytes provider or loader for the library or libraries identified by the key. As will be recognized, store 800 may include keys for single-library bytes providers, as shown at entry 808, and for GroupedWrapper bytes providers and SubdirectoryWrapper bytes providers as shown at entries 812 and 814, respectively. As noted, store 800 may also comprise references to other loaders as shown at entry 810.

It should be noted that, although the concept of wrapper objects for multiple libraries has been described in connection with the bytes provider implementation, analogous wrappers may be provided in alternative implementations that do not employ bytes providers. Thus, as shown in FIG. 4, store 400 may, for example, include references to grouped wrapper delegation classloaders (e.g., entry 414) and subdirectory wrapper delegation classloaders (e.g., entry 416).

One implementation of the present system and method is embodied in the software code submitted herewith on compact disc and in hard copy which is hereby incorporated by reference for each of its teachings and embodiments.

| Name | Size | Created |
| --- | --- | --- |
| AbstractBytesProvider.java | 8,692 | Dec. 12, 2202 |
| AbstractBytesProviderDecorator.java | 2,461 | Dec. 12, 2202 |
| AbstractBytesProviderKey.java | 798 | Dec. 12, 2202 |
| BytesProvider.java | 1,668 | Dec. 12, 2202 |
| BytesProviderClassLoader.java | 2,228 | Dec. 12, 2202 |
| BytesProviderDelegationClassLoader.java | 7,518 | Dec. 12, 2202 |
| BytesProviderFactory.java | 27,370 | Dec. 12, 2202 |
| BytesProviderKey.java | 629 | Dec. 12, 2202 |
| BytesProviderPreferenceDelegationClassLoader.java | 3,605 | Dec. 12, 2202 |
| BytesProviderStore.java | 4,253 | Dec. 12, 2202 |
| BytesProviderUtil.java | 5,186 | Dec. 12, 2202 |
| CachedJarKey.java | 1,273 | Dec. 12, 2202 |
| ClassLoaderFactory.java | 5,015 | Dec. 12, 2202 |
| ClassLoadingMessages.java | 8,746 | Dec. 12, 2202 |
| ClassLoadingMessages.properties | 6,813 | Dec. 12, 2202 |
| Configuration.java | 9,712 | Dec. 12, 2202 |
| DiskCacheJarBytesProvider.java | 6,092 | Dec. 12, 2202 |
| ExplodedLocalStorage.java | 3,465 | Dec. 12, 2202 |
| ExtraJarDependencies.java | 3,833 | Dec. 12, 2202 |
| FileTreeList.java | 1,309 | Dec. 12, 2202 |
| GroupedWrapperBytesProvider.java | 4,371 | Dec. 12, 2202 |
| GroupKey.java | 3,761 | Dec. 12, 2202 |
| Handler.java | 335 | Dec. 12, 2202 |
| JarCacheTypeSelector.java | 1,839 | Dec. 12, 2202 |
| JarKey.java | 707 | Dec. 12, 2202 |
| JarProcessor.java | 1,388 | Dec. 12, 2202 |
| JarProcessorCallback.java | 641 | Dec. 12, 2202 |
| JarProcessorMessages.java | 321 | Dec. 12, 2202 |
| JarProcessorMessages.properties | 33 | Dec. 12, 2202 |
| JarxInputStreamHelper.java | 2,738 | Dec. 12, 2202 |
| JarxURLConnection.java | 483 | Dec. 12, 2202 |
| LocalStorage.java | 8,000 | Dec. 12, 2202 |
| ManagedClassLoader.java | 3,875 | Dec. 12, 2202 |
| MemoryCacheJarBytesProvider.java | 9,431 | Dec. 12, 2202 |
| NullJarProcessorCallBack.java | 646 | Dec. 12, 2202 |
| ParentClassLoaderFactory.java | 684 | Dec. 12, 2202 |
| PlainLocalStorage.java | 1,549 | Dec. 12, 2202 |
| PreferenceDelegationClassLoader.java | 2,003 | Dec. 12, 2202 |
| SubdirectorWrapperBytesProvider.java | 2,203 | Dec. 12, 2202 |
| SubdirKey.java | 2,232 | Dec. 12, 2202 |
| URLBytesProvider.java | 4,256 | Dec. 12, 2202 |
| URLClassLoaderCE.java | 651 | Dec. 12, 2202 |
| URLKey.java | 729 | Dec. 12, 2202 |

It should also be noted that although the above embodiments have been described primarily in terms of a Java runtime environment, those skilled in the art will recognize that the principles of the present invention are capable of application in other runtime environments such as Microsoft's .Net runtime environment. For example, as understood in the art, .Net uses the term assembly resolver to describe a software component that is functionally analogous to a classloader in Java. For purposes of the present application, applicant intends that terms such as classloader, class, loading, and library be understood in their functional sense, and be construed to cover their respective analogs in other runtime environments.

While the invention has been described in conjunction with specific embodiments, it is evident that numerous alternatives, modifications, and variations will be apparent to those persons skilled in the art in light of the foregoing description.

What is claimed is:

1. A computer-based method for reducing memory consumption by reducing identical resources in a virtual machine environment, said computer-based method implemented in computer readable program code, said computer readable program code stored in computer memory, said computer-based method comprising the steps of:

loading an application in said virtual machine environment;

a plurality of class loaders in memory, each class loader in said plurality of class loaders being associated with a library code;

a store comprising a plurality of references to existing class loaders stored in the memory, creating a delegation class loader (DCL), wherein said DCL identifies one or more libraries referenced by said loaded application and said DCL determining if an existing class loader is available for loading at least one library among said one or more libraries stored in the memory and said DCL determining if a reference exists to said existing class loader for said at least one library;

delegating task of loading said at least one library to said existing class loader based on said determined reference; and said delegating step limiting identical resources in memory and reducing memory consumption by not creating class loaders to load libraries that are already loaded by existing class loaders.

2. The computer-based method of claim 1, wherein the virtual machine environment is a Java virtual machine environment.

3. A computer-based system for reducing memory consumption in a virtual machine environment by reducing copies of code in memory, comprising:

a virtual machine environment for executing code;

a plurality of class loaders in memory, each class loader in said plurality of class loaders being associated with a library code;

a store comprising a plurality of references to existing class loaders stored in the memory, computer readable program code stored in said memory that, upon loading a new application in said virtual machine environment: creating a delegation class loader (DCL), said DCL identifying at least one library referenced by said loaded new application, determining if an existing class loader is available in said store for loading said at least one library and determining if a reference exists for said existing class loader, and delegating a task of loading said at least one library to said existing class loader based on said determined reference; and said delegation limiting identical resources in said memory and reducing memory consumption by not creating class loaders to load libraries that are already loaded by existing class loaders.

4. A computer-based system for reducing memory consumption in a run time environment by reducing copies of code in memory, comprising:

a processor; and computer storage storing computer readable program code that is executable by said processor to reduce memory consumption in a run time environment by reducing copies of code in memory, said computer storage comprising:

computer readable program code loading an application in said run time environment;

computer readable program code implementing a plurality of class loaders in memory, each class loader in said plurality of class loaders being associated with a library code;

computer readable program code implementing a store in memory comprising a plurality of references to existing class loaders stored in the memory, computer readable program code creating a delegation class loader (DCL), wherein said DCL identifies one or more libraries referenced by said loaded application, said DCL determining if an existing class loader is available for loading at least one library among said one or more libraries, and said DCL determining if a reference exists to said existing class loader for said at least one library;

computer readable program code delegating task of loading said at least one library to said existing class loader based on said determined reference; and computer readable program code limiting, based on said delegation, identical resources in memory and reducing memory consumption by not creating class loaders to load libraries that are already loaded by existing class loaders.

5. The computer-based system of claim 4, wherein the runtime environment is a .lava runtime environment.

6. The computer-based system of claim 4, wherein the runtime environment is a .Net runtime environment.

* * * * *

UNITED STATES PATENT AND TRADEMARK OFFICE
CERTIFICATE OF CORRECTION

| | | |
|---|---|---|
| PATENT NO. | : 7,665,087 B1 | Page 1 of 1 |
| APPLICATION NO. | : 10/319875 | |
| DATED | : February 16, 2010 | |
| INVENTOR(S) | : Bosschaert et al. | |

It is certified that error appears in the above-identified patent and that said Letters Patent is hereby corrected as shown below:

Column 10, line 10, delete ".lava" and insert --Java--.

Signed and Sealed this

Sixth Day of July, 2010

David J. Kappos
*Director of the United States Patent and Trademark Office*